US012638299B2

(12) United States Patent
      Koike

(10) Patent No.:    US 12,638,299 B2
(45) Date of Patent:    May 26, 2026

(54) NAVIGATION DEVICE AND BATTERY ELECTRIC VEHICLE

(71) Applicant: TOYOTA JIDOSHA KABUSHIKI KAISHA, Toyota (JP)

(72) Inventor: Taiji Koike, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/053,859

(22) Filed: Feb. 14, 2025

(65) Prior Publication Data

US 2025/0283728 A1      Sep. 11, 2025

(30) Foreign Application Priority Data

Mar. 6, 2024    (JP) ................................. 2024-034292

(51) Int. Cl.
    *G01C 21/34*      (2006.01)
    *G01C 21/36*      (2006.01)
(52) U.S. Cl.
    CPC ..... *G01C 21/3469* (2013.01); *G01C 21/3679* (2013.01); *B60L 2240/72* (2013.01)
(58) Field of Classification Search
    CPC ............ G01C 21/3469; G01C 21/3679; G01C 21/3682; B60L 2240/72
    See application file for complete search history.

(56) References Cited

U.S. PATENT DOCUMENTS

| | | | | |
|---|---|---|---|---|
| 2013/0345945 A1* | 12/2013 | Fischer | .............. | G01C 21/3469 |
| | | | | 701/102 |
| 2017/0343366 A1* | 11/2017 | You | ....................... | G01C 21/343 |
| 2022/0252414 A1* | 8/2022 | Lerner | ............... | G06Q 30/0283 |
| 2023/0241992 A1* | 8/2023 | Lei | ................... | G08G 1/096725 |
| 2024/0027214 A1* | 1/2024 | Yang | .................. | G01C 21/3469 |
| 2025/0189324 A1* | 6/2025 | Kim | .......................... | G07C 5/04 |

FOREIGN PATENT DOCUMENTS

JP      H10-170293 A      6/1998

* cited by examiner

*Primary Examiner* — Jacob M Amick
(74) *Attorney, Agent, or Firm* — SoraIP, Inc.

(57)      ABSTRACT

A navigation device that generates a planned travel route from a current location to a destination via a waypoint. When a battery electric vehicle does not need to turn around to get from the current location to a first facility, the navigation device sets the first facility as the waypoint, and when the battery electric vehicle needs to turn around to get from the current location to the first facility, the navigation device sets a second facility as the waypoint, the first facility being a charging facility with a longest straight-line distance from the current location or a longest travel distance from the current location within a cruising range of the battery electric vehicle from the current location, and the second facility being a charging facility with a second longest straight-line distance from the current location or a second longest travel distance from the current location after the first facility.

4 Claims, 3 Drawing Sheets

NAVIGATION DEVICE AND BATTERY ELECTRIC VEHICLE

CROSS-REFERENCE TO RELATED APPLICATION

This application claims priority to Japanese Patent Application No. 2024-034292 filed on Mar. 6, 2024, incorporated herein by reference in its entirety.

BACKGROUND

1. Technical Field

The present disclosure relates to navigation devices and battery electric vehicles.

2. Description of Related Art

Conventionally, a navigation device has been proposed that is used in a battery electric vehicle and that searches for a route from a current location to a destination (see, for example, Japanese Unexamined Patent Application Publication No. 10-170293 (JP 10-170293 A)). When the distance from the current location to the destination in the found route is greater than the cruising range of the battery electric vehicle, this device searches for a route from the current location to the destination via a charging facility. This device can thus perform a search in consideration of the cruising capacity of the battery electric vehicle.

SUMMARY

With the above navigation device, there is a case where the vehicle turns around and travels in a direction different from the destination while traveling between the current location and the charging facility as a waypoint. In this case, the vehicle needs to turn around again etc. to head to the destination after being charged at the charging facility. This may increase the travel distance of the battery electric vehicle, and the vehicle may be unable to efficiently reach the destination.

The present disclosure provides a navigation device that reduces an increase in travel distance from a current location to a charging facility.

The navigation device and battery electric vehicle of the present disclosure adopt the following measures.

The navigation device of the present disclosure is used in a battery electric vehicle and generates a planned travel route from a current location to a destination via a waypoint.

The battery electric vehicle includes a motor for traction, an energy storage device that transfers electric power to and from the motor, and an external charging device that is configured to charge the energy storage device with electric power from outside. When the battery electric vehicle does not need to turn around to get from the current location to a first facility, the navigation device sets the first facility as the waypoint. When the battery electric vehicle needs to turn around to get from the current location to the first facility, the navigation device sets a second facility as the waypoint. The first facility is a charging facility with a longest straight-line distance from the current location or a longest travel distance from the current location within a cruising range of the battery electric vehicle from the current location. The second facility is a charging facility with a second longest straight-line distance from the current location or a second longest travel distance from the current location after the first facility.

When the battery electric vehicle does not need to turn around to get from the current location to the first facility, namely the charging facility with the longest straight-line distance from the current location or the longest travel distance from the current location within the cruising range of the battery electric vehicle from the current location, the navigation device of the present disclosure sets the first facility as the waypoint. This allows to generate a route that passes through the first facility that is a farther charging facility. When the battery electric vehicle needs to turn around to get from the current location to the first facility, the navigation device of the present disclosure sets, as the waypoint, the second facility, namely the charging facility with the second longest straight-line distance from the current location or the second longest travel distance from the current location after the first facility. This reduces turnarounds of the battery electric vehicle and thus reduces an increase in travel distance from the current location to a charging facility.

In the navigation device of the present disclosure, when the battery electric vehicle needs to turn around to get from the current location to the first facility and the battery electric vehicle does not pass through an interchange or a tollgate to turn around, the navigation device may set the first facility as the waypoint, and when the battery electric vehicle needs to turn around to get from the current location to the first facility and the battery electric vehicle passes through the interchange or the tollgate to turn around, the navigation device may set the second facility as the waypoint. The battery electric vehicle is therefore less likely to pass through an interchange or a tollgate to turn around, which reduces both an increase in travel distance and unnecessary toll payments.

In the navigation device of the present disclosure, when the battery electric vehicle is able to get to the destination with a current amount of energy stored in the energy storage device, the navigation device may set, as the planned travel route, such a route from the current location to the destination that does not pass through the first facility and the second facility. This reduces an increase in travel distance.

The battery electric vehicle of the present disclosure includes: the navigation device according to any one of the above aspects of the present disclosure, that is, the navigation device that is used in a battery electric vehicle and that generates a planned travel route from a current location to a destination via a waypoint, the battery electric vehicle including a motor for traction and an energy storage device that transfers electric power to and from the motor. When the battery electric vehicle does not need to turn around to get from the current location to a first facility, the navigation device sets the first facility as the waypoint. When the battery electric vehicle needs to turn around to get from the current location to the first facility, the navigation device sets a second facility as the waypoint. The first facility is a charging facility with a longest straight-line distance from the current location or a longest travel distance from the current location within a cruising range of the battery electric vehicle from the current location. The second facility is a charging facility with a second longest straight-line distance from the current location or a second longest travel distance from the current location after the first facility. The battery electric vehicle of the present disclosure further includes:

the motor; and the energy storage device.

The battery electric vehicle of the present disclosure includes the navigation device according to any one of the above aspects of the present disclosure. Therefore, the battery electric vehicle of the present disclosure has the same effects as those of the navigation device according to any one of the above aspects of the present disclosure. For example, the battery electric vehicle of the present disclosure has an effect similar to reducing an increase in travel distance from the current location to a charging facility.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
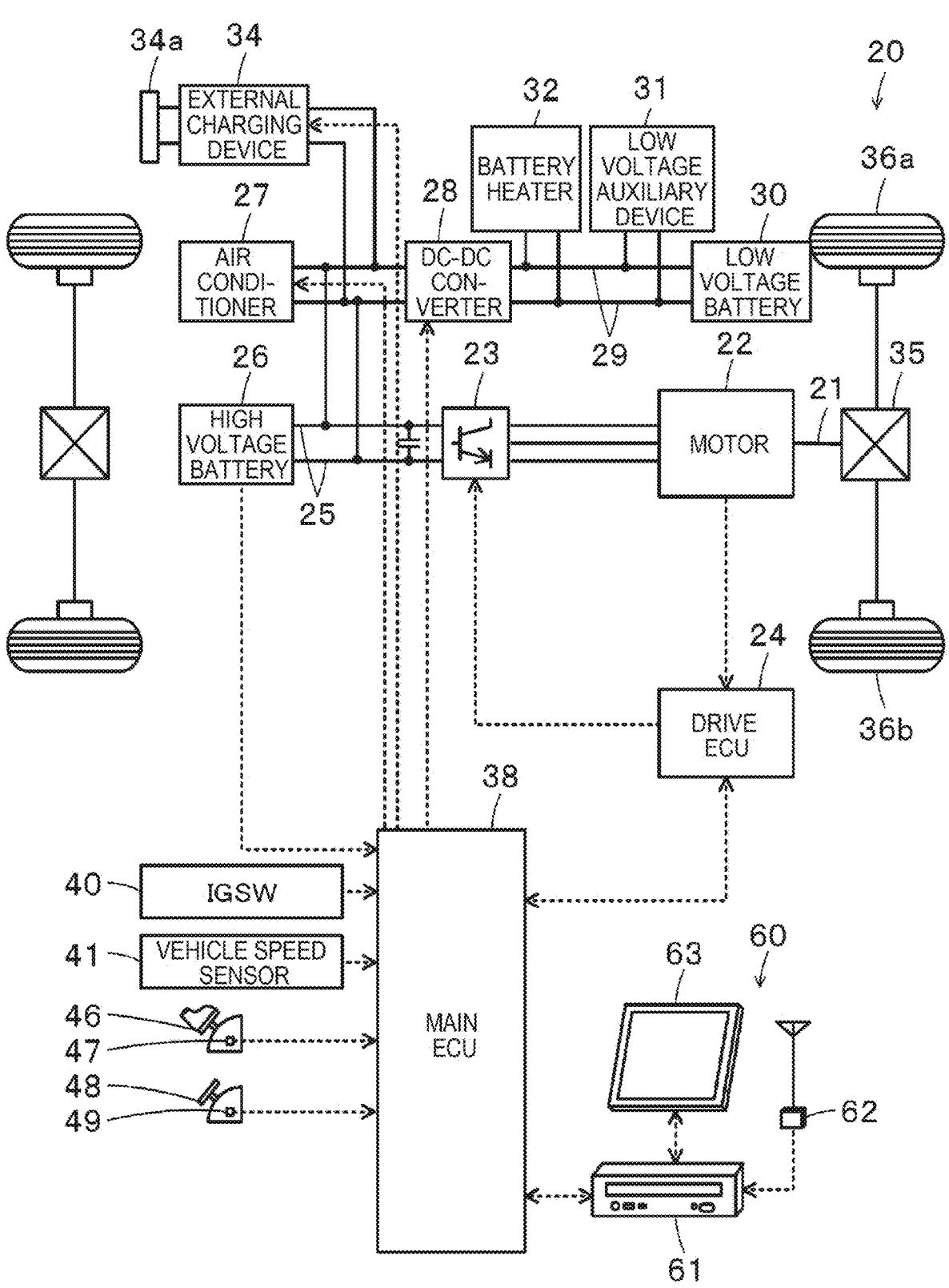
FIG. 1 is a schematic configuration diagram of a battery electric vehicle 20 in which a navigation device 60 according to an embodiment of the present disclosure is mounted.

Embodiments of the present disclosure will be described with reference to the drawings. FIG. 1 is a schematic configuration diagram of a battery electric vehicle 20 in which a navigation device 60 according to an embodiment of the present disclosure is mounted. As illustrated, battery electric vehicle 20 of the embodiment includes a driving motor 22, an inverter 23, a high-voltage battery 26 as an energy storage device, and an air conditioner 27. As illustrated, battery electric vehicle 20 of the embodiment includes DC/DC converters 28, a low-voltage battery 30, a low-voltage auxiliary device 31, a battery heater 32, an external charging device 34, a main electronic control unit (hereinafter referred to as "main ECU") 38, and a navigation device 60.

The motor 22 is configured as, for example, a synchronous generator motor, and the rotor of the motor 22 is connected to a drive shaft 21 connected to the drive wheel 36*a*, 36*b* via a differential gear 35.

The inverter 23 includes a plurality of switching elements and is connected to the high-voltage battery 26 via a high-voltage system power line 25. The motor 22 is rotationally driven by switching control of a plurality of switching elements of the inverter 23 by a driving electronic control unit (hereinafter referred to as a "driving ECU") 24. A smoothing capacitor is attached to the high-voltage system power line 25.

Although not shown, the drive ECU 24 includes a microcomputer having a CPU, ROM, RAM, a flash memory, an input/output port, and a communication port. The drive ECU 24 receives signals from various sensors via input ports. For example, the drive ECU 24 receives the rotational position θm from the rotational position sensor that detects the rotational position of the rotor of the motor 22, and the phase current Iu, Iv from the current sensor that detects the phase current of each phase of the motor 22. The drive ECU 24 controls the inverter 23. The drive ECU 24 calculates the electric angle θe and the rotational speed Nm (the rotational speed Nd of the drive shaft 21) of the motor 22 based on the rotational position θm of the rotor of the motor 22 from the rotational position sensor. The drive ECU 24 calculates the torque Tm of the motor 22 on the basis of the electric angle θe of the motor 22 and the phase current Iu, Iv of each phase of the motor 22 from the current sensor, or calculates Pm of used powers of the motor 22 on the basis of the torque Tm and the rotational speed Nm of the motor 22. The drive ECU 24 communicates with the main ECU 38 via a communication port.

The high-voltage battery 26 is configured as, for example, a lithium-ion secondary battery or a nickel-hydrogen secondary battery, and is connected to the inverter 23 via the high-voltage system power line 25 as described above.

The air conditioner 27 includes a refrigeration cycle including a compressor, a condenser, an expansion valve, and an evaporator, and a blower fan, and performs air conditioning in the vehicle cabin. DC/DC converters 28 step down the power of the high-voltage system power line 25 and provide the power to the low-voltage power line 29.

The low-voltage battery 30 is configured as, for example, a lead-acid battery having a lower rated voltage than the high-voltage battery 26. Examples of the low-voltage auxiliary device 31 include various lights, an audio system, a power window, and a seat heater. The battery heater 32 heats the high-voltage battery 26. The low-voltage battery 30, the low-voltage auxiliary device 31, and the battery heater 32 are connected to a low-voltage power line 29.

When the external charging connector 34*a* and a connector (not shown) to which electric power is supplied from an external charging facility are connected, the external charging device 34 supplies electric power from the external charging facility to the high-voltage system power line 25 to charge the high voltage battery 26.

The main ECU 38 includes a microcomputer similar to the drive ECU 24. The main ECU 38 receives signals from various sensors via input ports. For example, the main ECU 38 receives a line voltage VH from a voltage sensor attached to the high-voltage system power line 25 and a voltage Vb from a voltage sensor attached between terminals of the high voltage battery 26. Further, for example, the main ECU 38 receives a current Ib from a current sensor attached to an output terminal of the high-voltage battery 26 and a temperature Tb from a temperature sensor attached to the high-voltage battery 26. The main ECU 38 also receives the ignition signal IG from the ignition switch 40 and the vehicle speed V from the vehicle speed sensor 41. The main ECU 38 also receives the accelerator pedal position AP from the accelerator pedal position sensor 47 that detects the depression amount of the accelerator pedal 46. The main ECU 38 also receives the brake pedal position BP from the brake pedal position sensor 49 that detects the depression amount of the brake pedal 48.

The main ECU 38 controls, for example, the air conditioner 27, DC/DC converters 28, and the external charging device 34. The main ECU 38 calculates the state of charge SOC of the high-voltage battery 26 based on the integrated value of the current Ib of the high-voltage battery 26 from the current sensor. The main ECU 38 calculates the power Pac used by the air conditioner 27 connected to the high-voltage system power line 25, the power Phoki used by the low-voltage auxiliary device 31 and the battery heater 32 connected to the low-voltage power line 29, and BAT_Preac. The power Pac used by the air conditioner 27 may be, for example, a power sensor attached to the air conditioner 27 and detected by the power sensor. The used power Phoki BAT_Preac may be, for example, a power sensor attached to the low-voltage auxiliary device 31 or the battery heater 32, and may be detected by the power sensor. As described above, the main ECU 38 communicates with the drive ECU 24 via a communication port. The main ECU 38 also communicates with the navigation device 60 via a communication port.

The navigation device 60 includes a main body 61 having a built-in control unit, a GPS antenna 62, and a display 63. The control unit of the main body 61 includes a storage medium (for example, a hard disk or an SSD), an input/output port, and a communication port. The storage medium stores map information and the like. The map information includes service information (for example, sightseeing information, a parking lot, a service area (hereinafter, referred to as "SA"), a charging facility, and the like), and road information of respective driving sections (for example, traffic lights, intersections, and the like). The road information includes distance information, width information, lane number information, area information (urban area or suburban area), type information (general road, automobile exclusive road, expressway), gradient information, statutory speed, number of traffic lights, and the like. GPS antennae 62 receive information about the current location of the host vehicle. The display 63 is configured as a touch panel type display, and displays various kinds of information such as map information, information on the current location of the host vehicle, and information on a planned travel route to a destination, and the like, and allows the user to input various kinds of instructions. When the user operates the display 63 to set the destination, the main body 61 of the navigation device 60 sets the planned travel route from the current location of the own vehicle to the destination based on the map information, the current location of the own vehicle, and the destination. Then, the main body 61 of the navigation device 60 displays the set planned travel route on the display 63, and performs route guidance.

In battery electric vehicle 20 of the embodiment configured in this way, the vehicles are caused to travel by cooperative control such as a main ECU 38 and a drive ECU 24.

Figure 2:
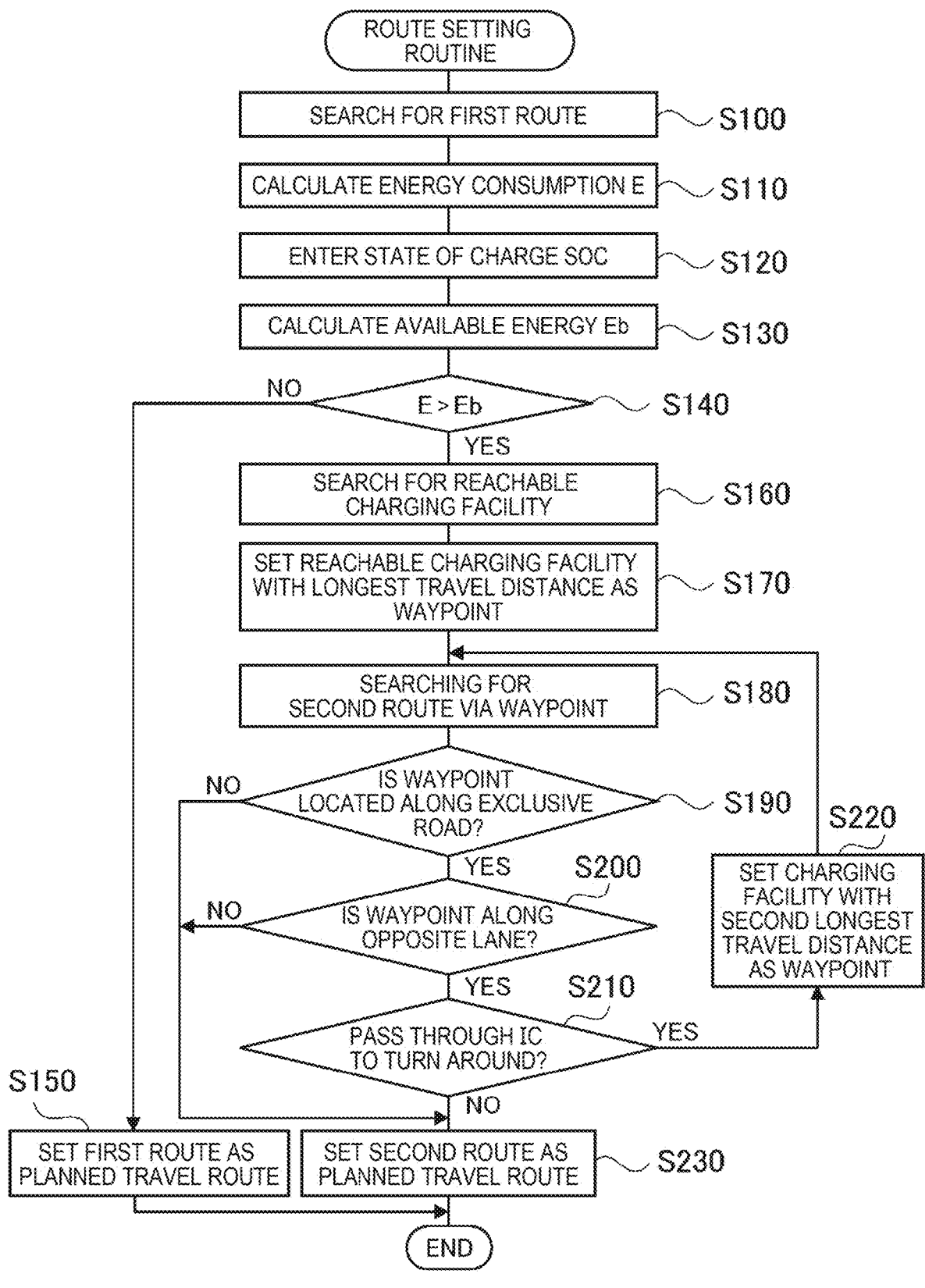
FIG. 2 is a flowchart illustrating an example of a route setting routine executed by the main body 61 of the navigation device 60.

Next, the operation of battery electric vehicle 20 according to the embodiment, in particular, the operation when the planned travel route is set by the navigation device 60 will be described. FIG. 2 is a flowchart illustrating an example of a route setting routine executed by the main body 61 of the navigation device 60. This routine is executed when the destination is set by the user operating the display 63.

When this routine is executed, the main body 61 searches for a first route that is a travel route that does not pass through the charging facility from the current location of the own vehicle to the destination based on the map information, the current location of the own vehicle, and the destination (S100). Subsequently, the consumed energy E consumed when the vehicle travels on the first route is calculated using the following equations (1) and (2) (S110). In Expression (1), "P" is the sum of the traveling resistance and the position energy in each traveling section when the first route is divided into a plurality of travel sections. The used-power Phoki, Pac and BAT_Preac are inputted from the main ECU 38. In Expression (2), "Vn", "L", and "d" are the average vehicle speed, the average distance, and the section average gradient in the respective travel sections, and are stored in advance in the storage medium of the control unit of the main body 61. "M" is the vehicle weight, is included in the vehicle specifications stored in the microcomputer of the main ECU 38, and is inputted to the main body 61 of the navigation device 60 via communication. "g" is a gravitational acceleration, and is stored in advance in the storage medium of the control unit of the main body 61. "η" is the efficiency in each traveling section, and is set to be greater than the value 0 when the motor 22 is powered and less than the value 0 when the motor 22 is regeneratively driven.

$$E = \int (P)\,dt + (Phoki)\,dt + \int (Pac)dt + \int (BAT\_Preac)\,dt \quad (1)$$

$$P = \int \left(aV_n^2 + bV_n + c/\eta\right)V_n dt + \int MgLsin\theta/\eta dt \quad (2)$$

Subsequently, the main body 61 receives the current state of charge SOC of the high-voltage battery 26 from the main ECU 38 (S120). Then, the main body 61 calculates the usable energy Eb as the largest value of the electric power usable in the high-voltage battery 26 (S130). The usable energy Eb is calculated by multiplying the state of charge SOC by the conversion factor K and converting the state of charge SOC into electric power. The conversion factor K is a coefficient for converting the state of charge SOC of the high-voltage battery 26 into electric power, which is stored in the main ECU 38 as a predetermined value by communication.

Then, the main body 61 determines whether or not the consumed energy E exceeds the usable energy Eb (S140). When the consumed energy E exceeds the usable energy Eb, the main body 61 determines that it is possible to reach the destination with the current state of charge SOC (stored amount of energy) of the high-voltage battery 26, sets the first route found in S100 as the planned travel route (S150), and ends this routine. When setting the planned travel route, the main body 61 displays the set planned travel route (in this case, the first route) on the display 63 and performs route guidance.

When the consumed energy E exceeds the usable energy Eb in S140, the main body 61 determines that it is better to charge the high-voltage battery 26 by way of a charging facility and then go to the destination because it cannot reach the destination with the current state of charge SOC of the high-voltage battery 26. Then, the main body 61 searches for all the charging facilities located within the reachable area of battery electric vehicle 20 (S160). Then, the main body 61 sets, as the waypoint, the first facility that is a charging facility with the longest travel distance from the current location out of the charging facilities found in S160 (S170). Then, a search is performed for a second route as a travel route from the current location of the host vehicle to the destination via the waypoint (S180).

When the second route is found, it is determined whether the waypoint is located along the automotive exclusive road (S190), and whether the waypoint is located along the opposing lane (S200). In automobile exclusive roads, in many cases, a traveling lane traveling from a current location to a waypoint and an opposite lane are separated from each other by a central separation zone. When a charging facility set as a waypoint is located along the opposite lane, the battery electric vehicle often needs to turn around to move from the traveling lane to the waypoint. For this reason, S190, S200 is a process for determining whether the battery electric vehicle needs to turn around to get from the current location to the charging facility as a waypoint. Here, the term "turn around" refers to an act of changing the direction to move in a direction opposite to a direction the battery electric vehicle has been traveling.

There are times when the waypoint is not located along the exclusive road for automobiles in S190 or when the waypoint is located along the exclusive road for automobiles in S190 but is not along the opposite lane in S200. At this time, it is determined that the battery electric vehicle does not need to turn around to get from the current location to the waypoint, the second route found in S180 is set as the planned travel route (S230), and this routine is ended. Now, since the first facility is set as the waypoint, the planned travel route is a route to the destination via the first facility. The navigation device 60 displays the route guidance on the display 63. This allows the high voltage battery 26 to be charged at the first facility. The first facility is a charging facility having the longest traveling distance from the current location among the charging facilities searched for by S160, and therefore, it is possible to suppress an increase in the number of times of charging until reaching the destination.

When the waypoint is along the automotive road and along the opposite lane in S190, S200, the main body 61 determines that the battery electric vehicle needs to turn around to get from the current location to the waypoint, and then determines whether the battery electric vehicle passes through an interchange (hereinafter referred to as "IC") to turn around into the opposite lane (S210). Herein, the term "IC" refers to a facility that connects a plurality of roads to each other. When passing through an IC to turn around into the opposite lane, the battery electric vehicle often pays a toll and then turns around into the opposite lane to head to the waypoint. Such a toll payment can be regarded as a payment that should be unnecessary because it is not necessary to pay this toll if the battery electric vehicle does not go to a waypoint. Therefore, the process of S210 is a process of determining whether an unnecessary toll payment will be caused by the turnaround.

When the battery electric vehicle does not pass through an IC to turn around in S210, the main body 61 determines that no toll payment will be caused by the turnaround, and the found second route is set as the planned travel route (S230), and the routine ends. When the planned travel route is set, the main body 61 displays the set planned travel route, that is, a route that reaches the destination via the first facility on the display 63, and performs route guidance.

When the battery electric vehicle passes through an IC to turn around in S210, the main body 61 determines that a toll payment will be caused by the turnaround. Then, the main body 61 sets the second facility, namely a charging facility at the longest travel distance from the current location after the first facility, that is, at the second longest travel distance from the current location, out of the charging facilities found in S160, as the waypoint (S220). Then, returning to S180, a search is performed for a second route as a travel route from the current location of the host vehicle to the destination via the waypoint (in this case, the second facility) set in S220 (S180). When the second facility is not along the automotive exclusive road in S190 or when the second facility is not along the other lane in S200, and when the battery electric vehicle does not pass through an IC to turn around in S210, the second route that passes through the second facility is set as the planned travel route (S230), and the routine ends. When the planned travel route is set, the main body 61 displays the set planned travel route, that is, a route that reaches the destination via the second facility on the display 63, and performs route guidance.

In the case where the second route is a travel route that passes through the second facility, the main body 61 proceeds to S220 when the second facility is located along a motor vehicle roadway in S190, the second facility is located along the opposing lane in S200, and the battery electric vehicle passes through an IC to turn around to head to the second facility in S210. Then, the main body 61 sets a charging facility at the longest distance from the current location after the second facility (at the third longest distance from the current location) as a waypoint. Then, the main body 61 repeats S220 from S180 until it is determined in S190 that the waypoint is not located along the automotive road or it is determined in S200 that the waypoint is not located along the opposite lane, or it is determined in S210 that the battery electric vehicle does not pass through an IC to turn around. When it is determined in S190 that the waypoint is not located along the automotive road or it is determined in S200 that the waypoint is not located along the opposite lane, or it is determined in S210 that the battery electric vehicle does not pass through an IC to turn around, the main body 61 sets, as the planned travel route, the second route that passes through the set route (S230) and ends this routine.

Figures 3, 4:
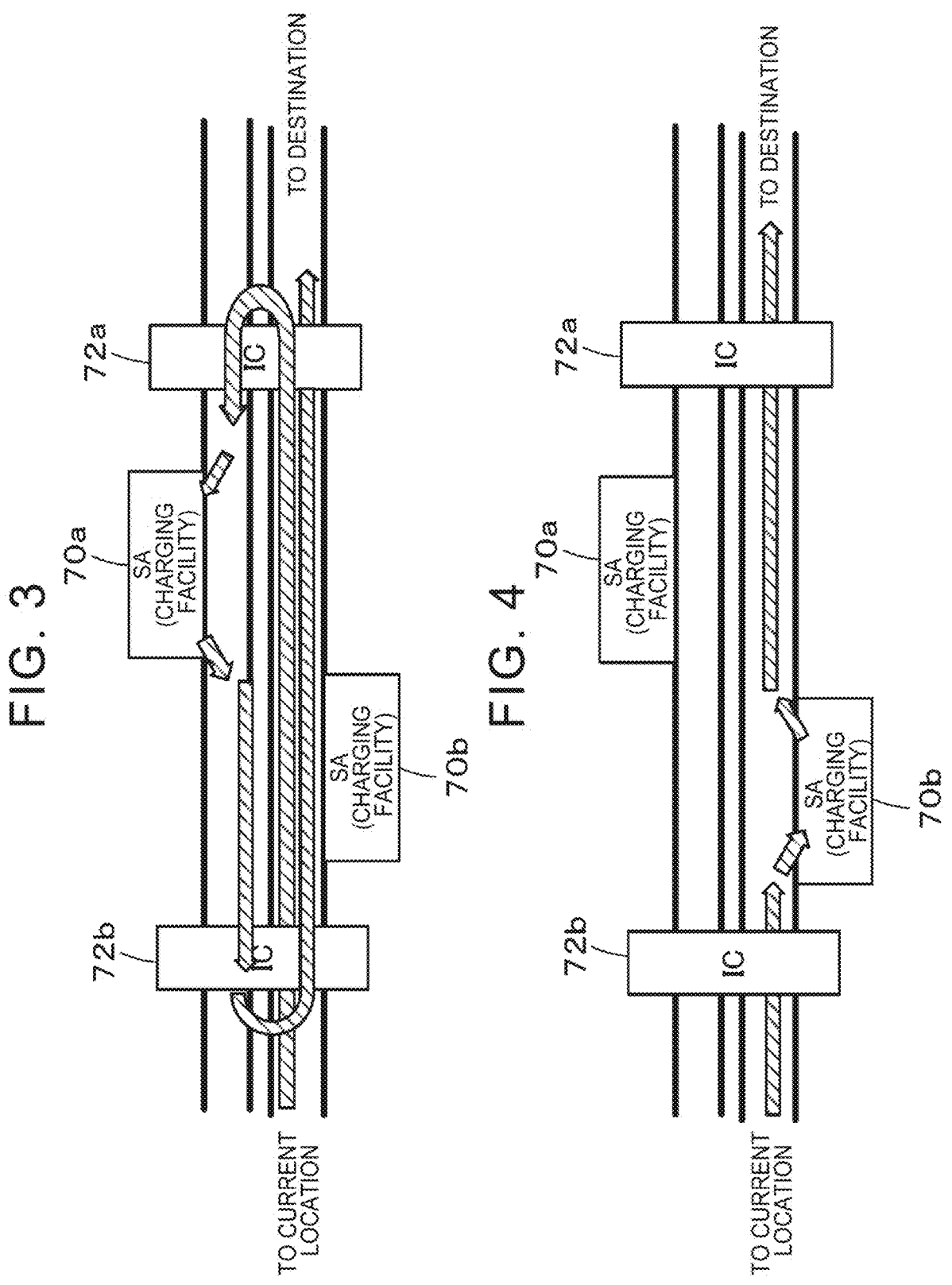
FIG. 3 is an illustration showing an example of a travel route when the first facility is set as a waypoint.
FIG. 4 is an illustration showing an example of a travel route when the second facility is set as a waypoint.

FIG. 3 is an illustration showing an example of a travel route when the first facility is set as a waypoint. It is sometimes the case that the first facility is located in SA 70a of the other lane of the motor vehicle. At this time, as shown in the figure, the planned travel route is a route along which the battery electric vehicle passes through an IC 72a to turn around and head to the charging facility, charges the high-voltage battery 26 of the battery electric vehicle 20 at an SA 70a, then travels in the opposite direction to the destination along the opposite lane, passes through an IC 72b to turn around into the original lane, and heads to the destination. In this route, the travel distance of battery electric vehicle 20 is greatly increased as compared with a route from the current location to the destination that does not pass through the waypoint. It is necessary to pay a toll when passing through the IC 72a, and an unnecessary toll is charged.

FIG. 4 is an explanatory diagram illustrating an example of a travel route when the second facility is set as a waypoint. In the present embodiment, when the first facility installed in SA 70a is located along the automotive road and along the opposite lane, and the battery electric vehicle passes through the IC to turn around, the second facility in the SA 70b is set as the waypoint, as shown in FIG. 4. Accordingly, it is possible to set the planned travel route without increasing the traveling distance of battery electric vehicle 20 significantly as compared with the travel route from the current location to the destination that does not pass through the waypoint. Then, an increase in the travel distance from the current location to the charging facility (second facility) can be suppressed. Since the battery electric vehicle does not pass through the IC 72a to turn around, an increase in toll can be reduced.

According to the battery electric vehicle 20 of the present embodiment described above, when the battery electric vehicle 20 does not need to turn around to get from the current location to the first facility, namely the charging facility with the longest travel distance from the current location within the cruising range of the battery electric vehicle 20 from the current location, the first facility is set as the waypoint. When the battery electric vehicle 20 needs to turn around to get from the current location to the first facility, the second facility, namely the charging facility with the second longest travel distance from the current location after the first facility, is set as the waypoint. As a result, an increase in the travel distance from the current location to the charging facility can be suppressed.

When the battery electric vehicle needs to turn around to get from the current location to the first facility and the battery electric vehicle does not pass through an IC to turn around, the first facility is set as a waypoint. When the battery electric vehicle needs to turn around to get from the current location to the first facility and the battery electric vehicle passes through an IC to turn around, the second facility is set as a waypoint. As a result, it is possible to reduce an increase in travel distance and unnecessary toll payments.

Further, when the battery electric vehicle can get to the destination with the current state of charge SOC of the high-voltage battery 26, the planned travel route is set as a route from the current location to the destination that does not pass through the first and second facilities, so that the travel distance can be suppressed from increasing.

In the above-described embodiment, in S160, the first facility is the charging facility having the longest travel distance from the current location within the cruising range of the battery electric vehicle 20 from the current location. However, the first facility may be a charging facility having the longest straight-line distance from the current location within the cruising range of the battery electric vehicle 20 from the current location.

In the above embodiment, it is determined in S210 whether the battery electric vehicle passes through an IC to turn around. However, instead of IC, it may be determined whether the battery electric vehicle passes through a tollgate to turn around.

In the above embodiment, it is determined in S210 whether the battery electric vehicle passes through an IC to turn around. However, S210 may not be executed. When the waypoint is located along the car road and along the opposite lane in S190 and S200, S220 may be performed to set a charging facility with the second longest travel distance as the destination.

In the above-described embodiment, battery electric vehicle 20 is equipped with the high-voltage battery 26 as the energy storage device. However, the installed energy storage device may be a capacitor or the like.

In the above-described embodiment, an example in which the navigation device 60 is mounted on a battery electric vehicle 20 is illustrated. However, the navigation device 60 may be used for battery electric vehicle 20. The navigation device 60 may be capable of communicating with battery electric vehicle 20 via a communication device without being mounted on battery electric vehicle 20.

The correspondence between the main elements of the embodiments and the main elements of the disclosure described in the column of the means for solving the problem will be described. In the embodiment, the motor 22 corresponds to the "motor", and the high-voltage battery 26 corresponds to the "energy storage device". In the embodiment, battery electric vehicle 20 corresponds to the "battery electric vehicle," and the navigation device 60 corresponds to the "navigation device".

Note that the correspondence between the main elements of the embodiment and the main elements of the disclosure described in the section of the means for solving the problem is an example for specifically explaining the embodiment of the disclosure described in the section of the means for solving the problem, and therefore the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described above, the present disclosure is not limited to such embodiments at all, and it is needless to say that the present disclosure can be carried out in various forms without departing from the gist of the present disclosure.

The present disclosure is applicable to a manufacturing industry of a navigation device, a manufacturing industry of a battery electric vehicle 20, and the like.

What is claimed is:

1. A navigation device that is used in a battery electric vehicle and that generates a planned travel route from a current location to a destination via a waypoint, the battery electric vehicle including a motor for traction and an energy storage device that transfers electric power to and from the motor, wherein, when the battery electric vehicle does not need to turn around to get from the current location to a first facility, the navigation device sets the first facility as the waypoint, and when the battery electric vehicle needs to turn around to get from the current location to the first facility, the navigation device sets a second facility as the waypoint, the first facility being a charging facility with a longest straight-line distance from the current location or a longest travel distance from the current location within a cruising range of the battery electric vehicle from the current location, and the second facility being a charging facility with a second longest straight-line distance from the current location or a second longest travel distance from the current location after the first facility.

2. The navigation device according to claim 1, wherein, when the battery electric vehicle needs to turn around to get from the current location to the first facility and the battery electric vehicle does not pass through an interchange or a tollgate to turn around, the navigation device sets the first facility as the waypoint, and when the battery electric vehicle needs to turn around to get from the current location to the first facility and the battery electric vehicle passes through the interchange or the tollgate to turn around, the navigation device sets the second facility as the waypoint.

3. The navigation device according to claim 1, wherein, when the battery electric vehicle is able to get to the destination with a current amount of energy stored in the energy storage device, the navigation device sets, as the planned travel route, such a route from the current location to the destination that does not pass through the first facility and the second facility.

4. A battery electric vehicle, comprising:
the navigation device according to claim 1;
the motor; and
the energy storage device.

* * * * *